US012312430B2

(12) United States Patent
Fujita et al.

(10) Patent No.: US 12,312,430 B2
(45) Date of Patent: May 27, 2025

(54) COMPOSITION FOR FORMING HYDROGEL, HYDROGEL, AND METHOD FOR PRODUCING COMPOSITION FOR FORMING HYDROGEL

(71) Applicant: KURARAY CO., LTD., Okayama (JP)

(72) Inventors: Akio Fujita, Tsukuba (JP); Goro Kobayashi, Chiyoda-ku (JP)

(73) Assignee: KURARAY CO., LTD., Okayama (JP)

( * ) Notice: Subject to any disclaimer, the term of this patent is extended or adjusted under 35 U.S.C. 154(b) by 694 days.

(21) Appl. No.: 17/424,575

(22) PCT Filed: Jan. 21, 2020

(86) PCT No.: PCT/JP2020/002007
§ 371 (c)(1),
(2) Date: Jul. 21, 2021

(87) PCT Pub. No.: WO2020/153382
PCT Pub. Date: Jul. 30, 2020

(65) Prior Publication Data
US 2022/0098347 A1   Mar. 31, 2022

(30) Foreign Application Priority Data
Jan. 22, 2019   (JP) ................. 2019-008738

(51) Int. Cl.
*C08F 261/04* (2006.01)
*C08L 51/00* (2006.01)

(52) U.S. Cl.
CPC .......... *C08F 261/04* (2013.01); *C08L 51/003* (2013.01)

(58) Field of Classification Search
None
See application file for complete search history.

(56) References Cited

U.S. PATENT DOCUMENTS

| 4,665,123 | A | * | 5/1987 | Goldenberg | ........... | G02B 1/043 |
| | | | | | | 525/61 |
| 5,679,371 | A | | 10/1997 | Tanihara et al. | | |
| 5,932,674 | A | | 8/1999 | Muller | | |
| 9,765,166 | B2 | | 9/2017 | Shibutani et al. | | |
| 2005/0287218 | A1 | | 12/2005 | Chaouk et al. | | |
| 2012/0009275 | A1 | | 1/2012 | Asfaw et al. | | |
| 2016/0324148 | A1 | | 11/2016 | Asfaw et al. | | |

FOREIGN PATENT DOCUMENTS

| JP | H4-7302 A | 1/1992 |
| JP | H4-222892 A | 8/1992 |
| JP | H04-292169 A | 10/1992 |
| JP | H8-206188 A | 8/1996 |
| JP | H09-080045 A | 3/1997 |
| JP | H10-513408 A | 12/1998 |
| JP | 2002-506813 A | 3/2002 |
| JP | 2007-246770 A | 9/2007 |
| JP | 2008-510021 A | 4/2008 |
| JP | 2011-8213 A | 1/2011 |
| WO | WO 2017/010459 A1 | 1/2017 |

OTHER PUBLICATIONS

Coté, Current Protocols in Cell Biology, Supplement 1, 1999. (Year: 1999).*
EESR issued in EP Patent Application No. 20744912.5, Sep. 9, 2022.
Stephanie J. Bryant et al., "Synthesis and Characterization of Photopolymerized Multifunctional Hydrogels: Water-Soluble Poly(Vinyl Alcohol) and Chondroitin Sulfate Macromers for Chondrocyte Encapsulation", Macromolecules, American Chemical Society, vol. 37, No. 18, Jul. 8, 2004, pp. 6726-6733, XP009529085.
ISR for PCT/JP2020/002007, dated Feb. 25, 2020.
Written Opinion for PCT/JP2020/002007, dated Feb. 25, 2020.
Fundueanu et al., "Poly(vinyl alcohol) microspheres with pH- and thermosensitive properties as temperature-controlled drug delivery", Acta Biomaterialia, 6:3899-3907 (2010).
Ting et al., "Use of polyvinyl alcohol as a cell immobilization matrix for copper biosorption by yeast cells", Journal of Chemical Technology and Biotechnology, 75:541-546 (2000).
Muhlebach et al., "New Water-Soluble Photo Crosslinkable Polymers Based on Modified Poly (vinyl alcohol)", Journal of Polymer Science: Part A: Polymer Chemistry, 35:3603-3611 (1997).
Schmedlen et al., "Photocrosslinkable polyvinyl alcohol hydrogels that can be modified with cell adhesion peptides for use in tissue engineering", Biomaterials, 23:4325-4332 (2002).
Bryant et al., "Synthesis and Characterization of Photopolymerized Multifunctional Hydrogels: Water-Soluble Poly(Vinyl Alcohol) and Chondroitin Sulfate Macromers for Chondrocyte Encapsulation", Macromolecules, 37:6726-6733 (2004).
Yasushi Tamada et al., "Photocrosslinking Behavior of a Highly Concentrated Aqueous Solution of Poly (vinyl alcohol) with Pendent Styrylpyridinium", Public Affairs of the Japan Society of Synthetic Resins, Japan, Japan Synthetic Rubber Co., Ltd., JSR Technical Review No. 97, Jan. 25, 1991, pp. 50-57.

* cited by examiner

Primary Examiner — Christopher M Rodd
(74) Attorney, Agent, or Firm — GREENBLUM & BERNSTEIN, P.L.C.

(57) ABSTRACT

Provided is a hydrogel-forming composition capable of forming a sterilized hydrogel having a high mechanical strength. Also provided are a hydrogel using the hydrogel-forming composition, and a method for producing the hydrogel-forming composition. The hydrogel-forming composition contains a vinyl alcohol polymer having an ethylenically unsaturated group and having a polymerization degree of 450 or more, in which the ethylenically unsaturated group introduction ratio is 0.01 to 10 mol % in all the structural units constituting the vinyl alcohol polymer, and in which no microorganisms detectable by the sterility test method (direct method) specified in the general test methods of the Japanese Pharmacopoeia are present.

4 Claims, No Drawings

COMPOSITION FOR FORMING HYDROGEL, HYDROGEL, AND METHOD FOR PRODUCING COMPOSITION FOR FORMING HYDROGEL

TECHNICAL FIELD

The present invention relates to a sterilized, hydrogel-forming composition that contains an ethylenically unsaturated group-having vinyl alcohol polymer. The present invention also related to a hydrogel using the hydrogel-forming composition, and to a method for producing the hydrogel-forming composition.

BACKGROUND ART

A polyvinyl alcohol (hereinafter this may be abbreviated as "PVA") is a water-soluble synthetic polymer having excellent characteristics in hydrophilicity, reactivity, biodegradability, biocompatibility and low toxicity and, when crosslinked, forms a flexible and high-strength gel. A hydrogel material containing a polyvinyl alcohol can be formed into various shapes using a 3D printer or a mold, and therefore can be used for contact lenses (for example, PTL 1), organ models (for example, PTL 2), drug delivery carriers (for example, NPL 1), and encapsulation carriers for cells and microorganisms (for example, NPL 2). In addition, by coating with a PVA hydrogel (for example, PTL 3), medical devices can be given blood compatibility and the like properties. Further, there are proposed a variety of uses, such as a use of forming a PVA hydrogel by injecting into a specific site in the field, for example, for artificial intervertebral disk nuclei (for example, PTL 4), foundation improving materials (for example, PTL 5), and antifouling coating materials (for example, PTL 6).

Heretofore, as a method for providing a gel by crosslinking PVA, for example, there is known a crosslinking method with a crosslinking agent having 2 or more aldehyde groups (e.g., glutaraldehyde). These days, however, as a method of more efficiently crosslinking than that using glutaraldehyde, a PVA macromer having an ethylenically unsaturated group in the pendant is proposed (PTLs 1 and 4, and NPL 3). The macromer has a stimulatory effect such that it can be more rapidly cured by stimulus of light or heat.

In the case of using the PVA macromer, first, the PVA macromer having an ethylenically unsaturated group in the pendant is dissolved in a water-based solvent to prepare an ink, but the ink produced in an ordinary environment has a problem that it may go moldy in long-term storage including distribution.

Among the above-mentioned uses, for those for drug delivery carriers, encapsulation carriers for cells and microorganisms, and artificial pulpy nuclei, a PVA hydrogel is formed in the body, or a PVA hydrogel is formed and then introduced into the body as it is, and therefore the ink itself for those uses need to be previously sterilized.

As a method for sterilizing the ink prepared by dissolving an ethylenically unsaturated group-having PVA macromer in a water-based solvent, for example, NPL 4 and 5 disclose a method for filtration sterilization of filtering a PVA ink through a filter having a pore size of 0.22 μm.

CITATION LIST

Patent Literature

PTL 1: JP 10-513408 A
PTL 2: JP 2011-008213 A
PTL 3: JP 2002-506813 A
PTL 4: JP 2008-510021 A
PTL 5: JP 2007-246770 A
PTL 6: WO2017/010459 A

Non-Patent Literature

NPL 1: Acta Biomaterialia, 2010, Vol 6, pp. 3899-3907
NPL 2: Journal of Chemical Technology and Biotechnology, 2000, Vol. 75, pp. 541-546
NPL 3: Journal of Polymer Science: Part A: Polymer Chemistry, 1997, Vol. 35, pp. 3603-3611
NPL 4: Biomaterials, 2002, Vol. 23, pp. 4325-4332
NPL 5: Macromolecules, 2004, Vol. 37, pp. 6726-6733

SUMMARY OF INVENTION

Technical Problem

By filtration sterilization through a filter, as described in NPLs 4 and 5, a sterilized PVA ink can be produced, which, however, is problematic in that, in relation to the pressure loss during filtration, only a PVA having a polymerization degree of smaller than 450 can be used. With that, in addition, the PVA hydrogel using a PVA macromer having a polymerization degree of less than 450 has another problem that the mechanical strength thereof is fragile.

As a sterilization method except filtration sterilization, there may be mentioned a method of using an energy ray such as gamma ray sterilization or an electron beam sterilization, which, however, is problematic in that in such a method, an ethylenically unsaturated group may react to crosslink a PVA macromer.

On the other hand, there is known a method of producing a PVA ink by sterilizing a solid PVA macromer with an ethylene oxide gas followed by dissolving it in a sterilized water-based solvent in an isolated aseptic environment, but this method requires an extremely troublesome operation and needs a tremendous cost including equipment.

Further, there is also mentioned a method of sterilization with an autoclave, but NPL 1 discloses only a method of autoclave sterilization of a previously-crosslinked PVA hydrogel and does not disclose anything about sterilization of a PVA ink. The technology of NPL 1 is for sterilizing a crosslinked PVA hydrogel, but, for example, when a crosslinked PVA hydrogel containing cells or microorganisms is autoclave-sterilized, the cells or microorganisms contained therein are also killed. Further, for artificial pulpy nuclei, a PVA ink is injected into the body and cured therein, and therefore this needs to be sterilized in a state of a fluid PVA ink, but the technology of NPL 1 could not be applicable thereto.

An object of the present invention is to provide a hydrogel forming composition capable of forming a sterilized hydrogel having a high mechanical strength. In addition, the present invention is also to provide a hydrogel using the hydrogel-forming composition, and a method for producing the hydrogel-forming composition.

Solution to Problem

As a result of assiduous studies, the present inventors have found that using a vinyl alcohol polymer having an ethylenically unsaturated group and having a polymerization degree of 450 or more, in which the ethylenically unsaturated group introduction ratio is 0.01 to 10 mol % in all the structural units constituting the vinyl alcohol polymer, enables sterilization with an autoclave, since the density of the ethylenically unsaturated group is low. In addition, the present inventors have further found that, since a vinyl alcohol polymer having a polymerization degree of 450 or more is used, the hydrogel produced by crosslinking the hydrogel-forming composition containing this is excellent in mechanical strength, and have completed the present invention.

Specifically, the present invention relates to the following [1] to [5].

[1] A hydrogel-forming composition containing a vinyl alcohol polymer having an ethylenically unsaturated group and having a polymerization degree of 450 or more, in which the ethylenically unsaturated group introduction ratio is 0.01 to 10 mol % in all the structural units constituting the vinyl alcohol polymer, and in which no microorganisms detectable by the sterility test method (direct method) specified in the general test methods of the Japanese Pharmacopoeia are present.

[2] The hydrogel-forming composition according to the above [1], wherein the ethylenically unsaturated group is at least one kind selected from the group consisting of a vinyl group, a (meth)acryloyloxy group, a (meth)acryloylamino group, a vinylphenyl group, a norbornenyl group, and derivatives thereof.

[3] A method for producing a hydrogel-forming composition of the above [1] or [2], wherein a composition preparation prepared by mixing the vinyl alcohol polymer and a solvent is sterilized.

[4] A method for producing a hydrogel-forming composition of the above [3], wherein the sterilization is autoclave sterilization.

[5] A hydrogel prepared by crosslinking a hydrogel-forming composition of the above [1] or [2].

Advantageous Effects of Invention

According to the present invention, there can be provided a hydrogel-forming composition capable of forming a sterilized hydrogel having a high mechanical strength. In addition, the present invention can provide a hydrogel using the hydrogel-forming composition, and a method for producing the hydrogel-forming composition.

DESCRIPTION OF EMBODIMENTS

Hereinunder the present invention is described in detail.

In the present specification, "(meth)acryl" means a general designation for "methacryl" and "acryl"; and "(meth)acryloyl" means a general designation for "methacryloyl" and "acryloyl".

[Hydrogel-Forming Composition]

The hydrogel-forming composition of the present invention is a hydrogel-forming composition containing a vinyl alcohol polymer having an ethylenically unsaturated group and having a polymerization degree of 450 or more, in which the ethylenically unsaturated group introduction ratio is 0.01 to 10 mol % in all the structural units constituting the vinyl alcohol polymer, and in which no microorganisms detectable by the sterility test method (direct method) specified in the general test methods of the Japanese Pharmacopoeia are present.

The hydrogel-forming composition of the present invention uses a vinyl alcohol polymer having an ethylenically unsaturated group and having a polymerization degree of 450 or more, and therefore can form a hydrogel excellent in mechanical strength. In addition, the forming composition uses a PVA macromer having a low ethylenically unsaturated group density, and therefore can be sterilized with an autoclave or the like.

[Vinyl Alcohol Polymer Having an Ethylenically Unsaturated Group and Having a Polymerization Degree of 450 or More]

The hydrogel-forming composition of the present invention uses a vinyl alcohol polymer having an ethylenically unsaturated group and having a polymerization degree of 450 or more (hereinafter this may be simply referred to as "a vinyl alcohol polymer").

The vinyl alcohol polymer for use in the present invention is not specifically limited so far as it has an ethylenically unsaturated group, has a polymerization degree of 450 or more and contains a vinyl alcohol-derived structural unit in an amount of more than 50 mol % in the polymer, and may contain a vinyl ester-derived structural unit. The total amount of the vinyl alcohol-derived structural unit and the vinyl ester-derived structural unit relative to all the structural units constituting the vinyl alcohol polymer is preferably 80 mol % or more, more preferably 90 mol % or more, even more preferably 95 mol % or more.

Not specifically limited, the ethylenically unsaturated group may be selected freely and is preferably a group capable of forming crosslinking between vinyl alcohol polymer chains by the action of active energy rays, heat or a redox initiator to be mentioned hereinunder. The ethylenically unsaturated group is more preferably a radical-polymerizable group, and examples thereof include a cyclic unsaturated hydrocarbon group such as a vinyl group, a (meth)acryloyloxy group, a (meth)acryloylamino group, a vinylphenyl group, a cyclohexenyl group, a cyclopentenyl group, a norbornenyl group or a dicyclopentenyl group, and derivatives thereof. These ethylenically unsaturated groups may exist in any of side chains or terminals of the vinyl alcohol polymer chain.

"Vinyl group" in the present invention includes not only an ethenyl group but also a chain-type unsaturated hydrocarbon group such as an allyl group or an alkenyl group, and also a vinyloxycarbonyl group.

Among the radical-polymerizable groups, at least one kind selected from the group consisting of a vinyl group, a (meth)acryloyloxy group, a (meth)acryloylamino group, a vinylphenyl group, a norbornenyl group, and derivatives thereof is preferred from the viewpoint of improving the mechanical strength of hydrogel. A functional group having a terminal unsaturated carbon bond is preferable, and a (meth)acryloyloxy group is more preferred from the viewpoint of reactivity.

The polymerization degree of the vinyl alcohol polymer needs to be 450 or more from the viewpoint of suppressing embrittlement of the hydrogel to be produced by crosslinking the hydrogel-forming composition. This is because when the polymerization degree is less than 450, the mechanical strength of the hydrogel extremely lowers, and when the polymerization degree is 450 or more, the hydrogel can have a good mechanical strength. From the viewpoint of suppressing increase in the viscosity of the hydrogel-forming composition so as to improve the processability thereof, the polymerization degree of the vinyl alcohol polymer is preferably 10,000 or less, more preferably 5,000 or less, even more preferably 3,000 or less, and is preferably 500 or more, more preferably 1,000 or more, even more preferably 1,500 or more. Two or more kinds vinyl alcohol polymers each having a different polymerization degree can be combined for use herein.

The polymerization degree of the vinyl alcohol polymer in the present specification is one measured according to JIS K 6726:1994. Specifically, the polymerization degree of the vinyl alcohol polymer can be considered to be the same as the polymerization degree of a polyvinyl alcohol to be a raw material as mentioned below, and therefore, the polyvinyl alcohol to be a raw material is purified and then the limiting viscosity thereof in water at 30° C. is measured, from which the polymerization degree can be derived.

<Production Method for Vinyl Alcohol Polymer>

A production method for the vinyl alcohol polymer for use in the present invention, that is, the vinyl alcohol polymer having an ethylenically unsaturated group and having a polymerization degree of 450 or more includes a method of introducing an ethylenically unsaturated group into a polyvinyl alcohol to be a raw material (hereinafter this may also be abbreviated as "raw material PVA") via the side chain or the terminal functional group thereof, and a method of introducing an ethylenically unsaturated group thereinto by copolymerizing a vinyl ester monomer and any other monomer than a vinyl ester monomer in the process of producing the raw material PVA followed by reacting the reactive substituent in the resultant copolymer with an ethylenically unsaturated group-having compound.

First, the raw material PVA can be produced by saponifying a polyvinyl ester prepared by polymerizing a vinyl ester monomer, and then converting the ester group in the polyvinyl ester into a hydroxy group.

Examples of the vinyl ester monomer include aliphatic vinyl esters such as vinyl formate, vinyl acetate, vinyl propionate, vinyl n-butyrate, vinyl isobutyrate, vinyl pivalate, vinyl versatate, vinyl caproate, vinyl caprylate, vinyl caprate, vinyl laurate, vinyl myristate, vinyl palmitate, vinyl stearate, and vinyl oleate; and aromatic vinyl esters such as vinyl benzoate. One alone or two or more kinds thereof can be used either singly or as combined.

Among the vinyl ester monomers, aliphatic vinyl esters are preferred, and from the viewpoint of production cost, vinyl acetate is more preferred. That is, the polyvinyl ester is preferably a polyvinyl acetate prepared by polymerizing vinyl acetate.

The polyvinyl ester may contain, as needed, a structural unit derived from any other monomer than the vinyl ester monomer, within a range not detracting from the advantageous effects of the present invention. Examples of the other monomer include α-olefins such as ethylene, propylene, n-butene, and isobutylene; (meth)acrylic acid or salts thereof; alkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate; (meth)acrylamide derivatives such as (meth)acrylamide, N-methyl(meth)acrylamide, N-ethyl(meth)acrylamide, N,N-dimethylacrylamide, diacetone acrylamide, (meth)acrylamidepropanesulfonic acid or salts thereof, (meth)acrylamidopropyldimethylamine or salt thereof or quaternary salts thereof, and N-methylol(meth)acrylamide or derivatives thereof; N-vinylamide derivatives such as N-vinylformamide, and N-vinylacetamide; vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether; nitriles such as acrylonitrile, and methacrylonitrile; vinyl halides such as vinyl chloride, and vinyl fluoride; vinylidene halides such as vinylidene chloride, and vinylidene fluoride; allyl compounds such as allyl acetate, and allyl chloride; maleic acid or salts, esters or acid anhydrides thereof; vinylsilyl compounds such as vinyltrimethoxysilane; and isopropenyl acetate. One alone or two or more kinds of these may be used either singly or as combined.

In the case where the polyvinyl ester contains a structural unit derived from the other monomer, the content of the structural unit derived from the other monomer is preferably less than 20 mol % relative to all the structural units constituting the polyvinyl ester, more preferably less than 10 mol %, even more preferably less than 5 mol %.

The method of saponifying the polyvinyl ester is not specifically limited, and can be the same as an already-known method. For example, an alcoholysis method or a hydrolysis method using an alkali catalyst or an acid catalyst can be employed. Above all, saponification using a sodium hydroxide (NaOH) catalyst in a solvent of methanol is simple and preferred.

The polymerization degree of the raw material PVA is 450 or more, and a specific preferred range thereof is the same as the polymerization degree of the vinyl alcohol polymer mentioned above. Two or more different kinds of raw material PVAs each having a different polymerization degree can be used as combined.

The polymerization degree of the raw material PVA as referred to in the present specification is one measured according to JIS K 6726:1994, as mentioned above. Specifically the raw material PVA is saponified and purified, and then the limiting viscosity thereof in water at 30° C. is measured, from which the polymerization degree can be derived.

The saponification degree of the raw material PVA is, from the viewpoint of improving the solubility in water of the raw material PVA, preferably 50 mol % or more, more preferably 60 mol % or more, even more preferably 65 mol % or more.

Also from the viewpoint of suppressing increase in the viscosity of the hydrogel-forming composition to be mentioned below and improving the storage stability of the hydrogel-forming composition, the saponification degree of the raw material PVA is preferably 99 mol % or less.

In the present specification, the saponification degree of the raw material PVA means a ratio (mol %) of the molar number of the vinyl alcohol unit relative to the total molar number of the structural unit capable of being converted into a vinyl alcohol unit through saponification (for example, vinyl acetate unit) and the vinyl alcohol unit constituting the raw material PVA, and can be measured according to JIS K 6726:1994.

The 4 mass % viscosity at 20° C. of the raw material PVA is preferably 0.5 to 100 mPa·s, more preferably 1 to 80 mPa·s, even more preferably 2 to 60 mPa·s.

When the viscosity falls within the range, the storage stability of the hydrogel-forming composition can be improved while keeping the viscosity thereof low.

The viscosity in the present specification means a viscosity at a temperature of 20° C. of an aqueous 4 mass % solution of the raw material PVA measured using a B-type viscometer (rotation number 12 rpm) according to a rotary viscometer method of JIS K 6726:1994.

Introduction of the ethylenically unsaturated group into the raw material PVA is preferably attained via the side chain or the terminal functional group of the raw material PVA, and more preferably, a compound containing an ethylenically unsaturated group (hereinafter this may be simply abbreviated as "an ethylenically unsaturated group-containing compound") is reacted with a hydroxy group of a side chain of the raw material PVA.

Examples of the ethylenically unsaturated group-containing compound to be reacted with a hydroxy group of a side chain of the raw material PVA include (meth)acrylic acid or derivatives thereof such as (meth)acrylic acid, (meth)acrylic acid anhydride, (meth)acrylic acid halides, and (meth)acrylates. These compounds may be reacted in a mode of esterification or interesterification in the presence of a base to introduce a (meth)acryloyl group. Among the ethylenically unsaturated group-containing compounds, preferred are (meth)acrylic acid, (meth)acrylic acid anhydride, and (meth)acrylates; more preferred are (meth)acrylates; and even more preferred is vinyl (meth)acrylate.

The ethylenically unsaturated group-containing compound that is reacted with a hydroxy group of a side chain or the raw material PVA may also be a compound containing an ethylenically unsaturated group and a glycidyl group in the molecule, and examples thereof include glycidyl (meth)acrylate, and allyl glycidyl ether. These compounds may be reacted in a mode of etherification in the presence of a base to introduce a (meth)acryloyl group or allyl group into the raw material PVA.

Further, examples of the ethylenically unsaturated group-containing compound that is reacted with a 1,3-diol group of the raw material PVA include compounds having an ethylenically unsaturated group and an aldehyde group in the molecule, such as acrylaldehyde (acrolein), methacrylaldehyde (methacrolein), 5-norbornene-2-carboxyaldehyde, 7-octenal, 3-vinylbenzaldehyde, and 4-vinylbenzaldehyde. These compounds may be reacted in a mode of acetalization in the presence of an acid catalyst to introduce an ethylenically unsaturated group into the raw material PVA. More specifically, for example, 5-norbornene-2-carboxyaldehyde, 3-vinylbenzaldehyde or 4-vinylbenzaldehyde may be reacted in a mode of acetalization to introduce a norbornenyl group or a vinylphenyl group into the raw material PVA. Also N-(2,2-dimethoxyethyl)(meth)acrylamide may be reacted to introduce a (meth)acryloylamino group into the raw material PVA.

As the method of introducing an ethylenically unsaturated group into the raw material PVA, any other method than the above-mentioned reaction methods is also employable, and two or more kinds of reaction may be combined and used here.

The other method of introducing an ethylenically unsaturated group is a method of copolymerizing a vinyl ester monomer with any other polymerizable monomer than a vinyl ester monomer having a reactive substituent except a hydroxy group, then saponifying the resultant copolymer to give a modified copolymer polyvinyl alcohol (hereinafter this may be abbreviated as "a modified copolymer PVA"), and thereafter reacting the carboxy group existing in the modified copolymer PVA or the amino group existing in the modified copolymer PVA with an ethylenically unsaturated group-containing compound, in a process of producing the raw material PVA. The modified copolymer PVA having a carboxy group may be referred to as "a carboxylic acid-modified PVA", and the copolymer having an amino group may be referred to as "an amino-modified PVA".

The monomer to constitute the carboxylic acid-modified PVA includes α,β-unsaturated carboxylic acids such as (meth)acrylic acid, maleic acid, fumaric acid and itaconic acid; alkyl (meth)acrylates such as methyl (meth)acrylate, and ethyl (meth)acrylate; and α,β-unsaturated carboxylic acid anhydrides and derivatives thereof such as maleic anhydride, and itaconic anhydride. For the carboxylic acid-modified PVA, for example, a vinyl ester monomer may be copolymerized with an α,β-unsaturated carboxylic acid anhydride or a derivative thereof, then saponified, and thereafter, for example, glycidyl methacrylate may be reacted with the introduced carboxyl group under an acid condition to form an ester bond to thereby introduce a methacryloyl group into the modified PVA.

For the amino-modified PVA, a vinyl ester monomer and an N-vinylformamide are copolymerized, then saponified, and the introduced amino group is amidated, for example, with an acrylic acid anhydride in the presence of a base to introduce an acryloylamino group into the modified PVA. Also by amidating the amino group of the amino-modified PVA with, for example, divinyl adipate, a vinyloxycarbonyl group may be introduced into the modified PVA. As the method of introducing an ethylenically unsaturated group via a modified copolymer PVA, any other method than those exemplified above is also employable, and two or more kinds of reaction can be combined and used here.

The ethylenically unsaturated group-having vinyl alcohol polymer is, from the viewpoint of easiness in production, preferably a vinyl alcohol polymer having an ethylenically unsaturated group introduced thereinto via a hydroxy group in a side chain of the raw material PVA, such as a 1,3-diol group, and is more preferably a vinyl alcohol polymer prepared by esterification or interesterification of a hydroxy group in a side chain of the raw material PVA with (meth)acrylic acid or a derivative thereof, or a vinyl alcohol polymer prepared by acetalization of a 1,3-diol group in the raw material PVA with a compound having an ethylenically unsaturated group and an aldehyde group in the molecule.

[Ethylenically Unsaturated Group Introduction Ratio]

The ethylenically unsaturated group introduction ratio is 0.01 to 10 mol % in all the structural units constituting the vinyl alcohol polymer. When the ethylenically unsaturated group introduction ratio is not less than the lower limit, the crosslinking reaction can be accelerated to rapidly form a hydrogel. On the other hand, when the ethylenically unsaturated group introduction ratio is not more than the upper limit, the elastic modulus of the resultant hydrogel can be improved. From these viewpoints, the ethylenically unsaturated group introduction ratio is preferably 0.05 mol % or more in all the structural units constituting the vinyl alcohol polymer, more preferably 0.1 mol % or more, even more preferably 0.5 mol % or more. With that, from the viewpoint of suppressing embrittlement of the hydrogel, the ratio is preferably 8 mol % or less, more preferably 5 mol % or less, even more preferably 3 mol % or less further more preferably 2 mol % or less, further more preferably 1.5 mol % or less.

<Production Method for Hydrogel-Forming Composition>

The production method for the hydrogel-forming composition of the present invention is not specifically limited. Examples thereof include a method of mixing a sterilized, above vinyl alcohol polymer and a sterilized solvent in an aseptic state (hereinunder this may be abbreviated as "a pre-sterilization method"), and a method of sterilizing a composition preparation prepared by mixing the above-mentioned vinyl alcohol polymer and a solvent (hereinafter this may be abbreviated as "a post-sterilization method"). Specific methods are described below.

The sterilization method for the compounds that need to be sterilized in the present invention, such as the above-mentioned vinyl alcohol polymer, the solvent and the composition preparation, is not specifically limited, and employable is any method capable of attaining sterilization in such a manner that no microorganisms detectable by the sterility test method specified in the general test methods of the Japanese Pharmacopoeia are present.

Examples of specific sterilization methods employable here include an autoclave sterilization method, an ethylene oxide gas sterilization method, a hydrogen peroxide low-temperature plasma sterilization method, a dry heat sterilization method, a chemical sterilization method with glutaraldehyde, and a radiation sterilization method with gamma rays or electron beams. In the present invention, a vinyl alcohol polymer having a polymerization degree of 450 or more is used, and therefore a filtration sterilization is difficult to employ but as a method for sterilizing the solvent for use in the above-mentioned pre-sterilization, a filtration sterilization method is employable.

Among the above, from the viewpoint in easiness in operation and the stability of the vinyl alcohol polymer, a post-sterilization method is preferred, and an autoclave sterilization method is preferably employed.

The condition for the autoclave sterilization method is not specifically limited, and for example, the sterilization is preferably carried out at 110 to 135° C., in a saturated water vapor, for 10 to 40 minutes. From the viewpoint of the stability of the vinyl alcohol polymer, the condition for the autoclave sterilization is preferably at 115 to 130° C. for 15 to 35 minutes, more preferably at 120 to 130° C. for 15 to 30 minutes, even more preferably at 120 to 125° C. for 15 to 20 minutes.

The autoclave sterilization in the present invention indicates a method of sterilization treatment with a heating steam in a high-pressure steam sterilizer. In general, autoclave sterilization is carried out for 30 minutes when the temperature of a heating steam is 115° C., or for 20 minutes when the temperature is 121° C., or for 15 minutes when the temperature is 126° C., and in the present invention, the autoclave sterilization can be carried out appropriately under the mentioned condition depending on the scale of the high-pressure steam sterilizer and the preparation.

The solvent usable for the hydrogel-forming composition of the present invention is preferably water, and can contain a water-soluble organic solvent. The water-soluble organic solvent includes an aprotic polar solvent such as dimethylformamide, dimethylacetamide, dimethyl sulfoxide, and N-methylpyrrolidone: a monoalcohol such as methanol, ethanol, propanol, and isopropanol; and a polyalcohol such as ethylene glycol, diethylene glycol, triethylene glycol, and glycerin. These water-soluble organic solvents can be mixed and used.

In the case where the hydrogel-forming composition contains the mentioned water-soluble organic solvent, the content thereof is preferably 30% by mass or less, more preferably 20% by mass or less, even more preferably 10% by mass or less.

The content of the solvent in the hydrogel-forming composition is preferably 50% by mass or more, more preferably 55% by mass or more, even more preferably 60% by mass or more, and is preferably 99% by mass or less, more preferably 98% by mass or less, even more preferably 95% by mass or less.

The content of the vinyl alcohol polymer in the hydrogel-forming composition is preferably 1% by mass or more, more preferably 2% by mass or more, even more preferably 5% by mass or more. From the viewpoint of preventing the viscosity of the hydrogel-forming composition from increasing high to secure good moldability, the content is preferably 50% by mass or less, more preferably 45% by mass or less, even more preferably 40% by mas or less, further more preferably 30% by mass or less. When the content of the vinyl alcohol polymer is less than 1% by mass, the strength of the resultant gel is low, but when it is more than 50% by mass, the viscosity of the hydrogel-forming composition increases high.

The solvent may be a buffer liquid or a medium. Not specifically limited, the buffer liquid and the medium may be any ones generally used for cell cultivation. Examples of the buffer liquid include general buffer solutions such as a citrate buffer solution, a phthalate buffer solution, a 3,3-dimethylglutarate buffer solution, an acetate buffer solution, a cacodylate buffer solution, a phosphate buffer solution, a tris buffer solution, an N-ethylmorpholine buffer solution, a borate buffer solution, and a carbonate buffer solution; and biochemical buffer solutions such as a phosphate-buffered physiological saline solution, a 2-morpholinoethanesulfonate (MES) buffer solution, a 2-[4-(2-hydroxyethyl)-1-piperazinyl]ethanesulfonate (HEPES) buffer solution, a 4-(2-hydroxyethyl)-1-piperazinepropanesulfonate (HEPPS) buffer solution, an Earle solution, and a Hanks solution. Examples of the medium include animal cell cultivation mediums such as an Eagle minimum essential medium (E-MEM), a Dulbecco-modified Eagle medium (D-MEM), and Ham's F-12 medium; and mediums for plants and microorganisms.

<Optional Components>

The hydrogel-forming composition of the present invention can optionally contain the following components depending on the use of the hydrogel.

[Polythiol]

The hydrogel-forming composition of the present invention may contain a polythiol. In the case where a vinyl alcohol polymer having a vinyl group as the ethylenically unsaturated group is used, for example, a polythiol having 2 or more thiol groups in the molecule may be added to utilize a thiol-ene reaction for crosslinking, from the viewpoint of accelerating curing. Such a polythiol is preferably a water-soluble one, and examples thereof include a hydroxy group-having polythiol such as dithiothreitol; and an ether bond-having polythiol such as 3,6-dioxa-1,8-octanedithiol, polyethylene glycol dithiol, and a terminal thiolated compound of multiarm polyethylene glycol.

In thiol-ene reaction, a vinyl group and a thiol group react in principle at a ratio of 1/1, and therefore it is preferable that the polythiol is added in such a manner that the thiol group is not in large excess relative to the vinyl group. Specifically, the amount of the thiol group is preferably 0.1 to 5 mols relative to 1 mol of the vinyl group, more preferably 0.3 to 2 mols, even more preferably 0.5 to 1 mol. When the amount of the thiol group relative to 1 mol of the vinyl group falls within the range, the mechanical strength of the hydrogel improves. Curing by thiol-ene reaction may also apply to a vinyl alcohol polymer having a vinyloxycarbonyl group as the ethylenically unsaturated group.

[Polymer Particles]

The hydrogel-forming composition of the present invention may contain polymer particles. As the polymer particles, hard or soft polymer particles that can be produced in ordinary emulsion polymerization can be used. In the case where the hydrogel-forming composition contains polymer particles, and when the resultant hydrogel is given external stress, the polymer particles can relieve the stress and/or may be collapsed to scatter the stress, thereby preventing fine cracks generated in the hydrogel from developing. Consequently the entire gel can be prevented from being collapsed and the toughness of the gel therefore increases.

The polymer to constitute the polymer particles may be a polymer formed of one type of a monomer unit, or may be a copolymer formed of plural types of monomer units. Also it may be a mixture of plural polymers.

The monomer includes conjugated dienes such as butadiene, and isoprene; aromatic vinyl compounds such as styrene, α-methylstyrene, and tert-butylstyrene; (meth)acrylic acid and salts thereof; (meth)acrylates such as methyl (meth)acrylate, ethyl (meth)acrylate, n-propyl (meth)acrylate, n-butyl (meth)acrylate, isopropyl (meth)acrylate, dicyclopentanyl (meth)acrylate, trimethylolpropane tri(meth)acrylate, and allyl (meth)acrylate; (meth)acrylamide; (meth)acrylamide derivatives such as N-methyl(meth)acrylamide, and N-ethyl(meth)acrylamide; nitriles such as (meth)acrylonitrile; vinyl ethers such as methyl vinyl ether, ethyl vinyl ether, n-butyl vinyl ether, and isobutyl vinyl ether; vinyl esters such as vinyl acetate, vinyl n-propionate, vinyl butyrate, and vinyl pivalate; unsaturated dicarboxylic acid anhydrides such as maleic anhydride, and itaconic anhydride; monoolefins such as ethene, propene, n-butene, and isobutene; ethylene halides such as vinyl bromide, vinylidene bromide, vinyl chloride, vinylidene chloride, vinylidene chloride, vinyl fluoride, and vinylidene fluoride; allyl compounds such as allyl acetate, and allyl chloride; unsaturated dicarboxylic acids and salts thereof such as maleic acid, fumaric acid, and itaconic acid; unsaturated dicarboxylates such as maleates and itaconates; vinylsilyl compounds such as trimethoxysilane; cyclic dienes such as cyclopentadiene, and norbornadiene; indenes such as indene, and tetrahydroindene; cyclic ethers such as ethylene oxide, propylene oxide, oxetane, and tetrahydrofuran; cyclic sulfides such as thiirane, and thietane; cyclic amines such as aziridine, and azetidine; cyclic acetals such as 1,3-dioxolan, 1,3,5-trioxane, and spiro-ortho esters; cyclic iminoethers such as 2-oxazoline, and iminoether; lactones such as β-propiolactone, δ-valerolactone, and ε-caprolactone; cyclic carbonates such as ethylene carbonate, and propylene carbonate; and cyclic siloxanes such as hexamethylcyclotrisiloxane, octamethylcyclotetrasiloxane, and decamethylcyclopentasiloxane.

Among these, from the viewpoint of productivity, at least one monomer selected from the group consisting of conjugated dienes, aromatic vinyl compounds and (meth)acrylates is preferred, and n-butyl (meth)acrylate, and dicyclopentanyl (meth)acrylate are more preferred.

The polymer particles to be contained in the hydrogel-forming composition of the present invention are, from the viewpoint of dispersibility in water, preferably polymers hydrophilized with a surfactant on the surface thereof. The production method for the polymer particles is not specifically limited. For example, the polymer particles can be produced through emulsion polymerization, suspension polymerization, or self-emulsification or mechanical emulsification of resin.

The average particle size of the polymer particles is preferably 0.01 to 10 µm, more preferably 0.02 to 1 µm, even more preferably 0.04 to 0.5 µm. In the case where the average particle size is large, the gel itself tends to whiten to lose transparency, and in addition, the particles readily precipitate, but even when the content thereof is small, the gel strength can be expected to improve. On the other hand, in the case where the average particle size is small, the content of the particles needs to be increased for improving the gel strength, but a gel having a high transparency tends to be obtained.

In the present invention, the average particle size indicates an average particle size measured with a dynamic light scattering measuring device.

In emulsion polymerization in the production method for the polymer particles, in general, a surfactant is used. Examples of the surfactant usable here include anionic surfactants such as sodium alkylbenzenesulfonates, sodium lauryl sulfate, higher fatty acid sodium salts, and rosin-type soap; nonionic surfactants such as alkyl polyethylene glycols, and nonylphenyl ethoxylate; cationic surfactants such as distearyldimethylammonium chloride, and benzalkonium chloride; and ampholytic surfactants such as cocamidopropylbetaine, and cocamidopropyl hydroxysultaine. In addition, also usable are polymer surfactants such as partially saponified PVA (saponification degree, 70 to 90 mol %), mercapto group-modified PVA (saponification degree, 70 to 90 mol %), β-naphthalenesulfonic acid-formalin condensate salts, and ethyl (meth)acrylate copolymers.

In emulsion polymerization in the production method, in general, a radical polymerization initiator is used. The radical polymerization initiator includes a water-soluble inorganic polymerization initiator, a water-soluble azo-type polymerization initiator, an oil-soluble azo-type polymerization initiator, and an organic peroxide. Also a redox polymerization initiator is also usable as the radical polymerization initiator. Further, as needed, a metal ion chelating agent, an electrolyte as a viscosity increase inhibitor, and a chain transfer agent may be added to the emulsion polymerization system.

Regarding the production method for the polymer particles, the polymer particles can also be produced according to a method where a polymer, such as a rubber of a natural rubber, a styrene-butadiene copolymer, a polybutadiene, a polyisoprene, an isobutylene-isoprene copolymer, a styrene-isoprene copolymer, a styrene-isoprene-butadiene copolymer, a halogenated isobutylene-isoprene copolymer, an ethylene-propylene-butadiene copolymer, an acrylonitrile-butadiene copolymer, a partial hydrogenate of an acrylonitrile-butadiene copolymer, or a polychloroprene is previously prepared, and the polymer is emulsified or suspended in water and then taken out by spray drying. When polymer particles having a glass transition temperature of 25° C. or lower are produced according to the mentioned method, the resultant particles may fuse together so that they become hardly re-dispersible in water. Therefore, in the method, it is desirable that the resultant particles are emulsified using, for example, a polymer surfactant of a partially saponified PVA as an emulsifier.

In the case where the hydrogel-forming composition contains polymer particles, the content thereof is preferably 2 to 20% by mass, more preferably 3 to 18% by mass, even more preferably 5 to 15% by mass. When the content of the polymer particles falls within the range, the mechanical strength of the hydrogel formed by crosslinking the hydrogel-forming composition may improve.

[Inorganic Particles]

The hydrogel-forming composition of the present invention may contain water-insoluble inorganic particles. Examples of the water-insoluble inorganic particles include silica such as precipitated silica, gel-like silica. vapor phase-process silica, and colloidal silica; ceramics such as alumina, hydroxyapatite, zirconia, zinc oxide, and barium titanate; minerals such as zeolite, talc, and montmorillonite; gypsum such as calcium sulfate; metal oxides such as calcium oxide, and iron oxide; metal carbonates such as calcium carbonate, and magnesium carbonate; and diatomaceous earth, soil, clay, sand, and gravels. One alone or two or more kinds of these inorganic particles may be used either singly or as combined. By adding water-insoluble inorganic particles, the gel can be given a function of high mechanical property or magnetic property. In addition, by drying and further sintering the resultant hydrogel containing inorganic particles, shaped and sintered inorganic articles can be produced.

In the case where the hydrogel-forming composition contains inorganic particles, the content thereof is preferably 2 to 20% by mass, more preferably 3 to 18% by mass, even more preferably 5 to 15% by mass. When the content of the inorganic particles falls within the range, the mechanical strength of the hydrogel formed by crosslinking the hydrogel-forming composition improves.

[Carboxy Group-Containing Water-Soluble Polymer (Interpenetration Gel)]

The hydrogel-forming composition of the present invention may contain a carboxy group-containing, water-soluble polymer. As the carboxy group-containing, water-soluble polymer, naturally occurring polysaccharides are preferred especially from the viewpoint of safety, which include alginic acid, carboxymethyl cellulose, LM pectin, carboxymethyl starch and derivatives thereof.

The hydrogel-forming composition of the present invention that contains a carboxy group-containing, water-soluble polymer can be cured according to the above-mentioned method, and thereafter the carboxy group-having water-soluble polymer may be crosslinked with a polyvalent metal ion of magnesium, calcium, barium, strontium, copper, iron, manganese or zinc. By forming an interpenetration gel by the ethylenically unsaturated group-having PVA that has been crosslinked with a radical polymerization initiator and the carboxy group-having water-soluble polymer that has been crosslinked with a polyvalent metal ion, as mentioned above, the mechanical strength of the resultant hydrogel can be exponentially increased.

In the case where the hydrogel-forming composition contains the above-mentioned water-soluble polymer, the content thereof is preferably 0.1 to 10% by mass, more preferably 0.5 to 8% by mass, even more preferably 1 to 4% by mass. When the content of the water-soluble polymer falls within the above range, the mechanical strength of the hydrogel formed by crosslinking the hydrogel-forming composition improves.

[Monomer]

The hydrogel-forming composition may further contain a monomer. The monomer includes acrylamides such as acrylamide, N-isopropylacrylamide, 2-acrylamide-2-methylpropanesulfonic acid, and N,N-dimethylacrylamide; α,β-unsaturated carboxylic acids such as (meth)acrylic acid, crotonic acid, itaconic acid, maleic acid, and fumaric acid; vinylpyridine; hydroxyethyl (meth)acrylate; styrenesulfonic acid; water-soluble radical-polymerizable monomers such as polyethylene glycol mono(meth)acrylate; and crosslinking agents having 2 or more ethylenically unsaturated groups in the molecule, such as N,N'-methylenebisacrylamide, ethylene glycol di(meth)acrylate, diethylene glycol di(meth)acrylate, and polyethylene glycol di(meth)acrylate.

The content of the monomer in the hydrogel-forming composition is, from the viewpoint of improving the mechanical strength of the hydrogel, preferably 20% by mass or less, more preferably 10% by mass or less, even more preferably 5% by mass or less.

[Cell, Physiologically Active Substance, Enzyme]

The hydrogel-forming composition of the present invention may contain a cell, a physiologically active substance and an enzyme. The term "cell" as referred to in the present specification is not specifically limited, preferably including multipotent stem cells, tissue stem cells, somatic cells, and mammal-derived established cell lines and insect cells for use for useful substance production for pharmaceuticals or for therapy.

Cells include adherent cells and floating cells, which, however, are not limitative. Adherent cells are cells that grow while adhering to cultivation vessels or carriers in cell culture. Floating cells are cells which do not basically require adhesion to cultivation vessels or carriers in cell culture. Floating cells includes cells that may weakly adhere to cultivation vessels or carriers.

The multipotent stem cells are stem cells having an ability to be differentiated into cells of any and every tissue (pluripotent differentiation), and examples thereof include embryo stem cells (ES cells), induced pluripotent stem cells (iPS cells), embryonic germ stem cells (EG cells), and germ stem cells (GS cells).

The tissue stem cells mean stem cells having an ability to be differentiated into various cell species though the differentiable tissue is limited (pluripotent differentiation), and examples thereof include bone marrow undifferentiated mesenchymal stem cells, skeletal muscle stem cells, hematopoietic stem cells, neural stem cells, hepatic stem cells, adipose tissue stem cells, epidermal stem cells, gut stem cells, sperm stem cells, pancreatic stem cells (pancreatic duct epithelial stem cells), leukocytic series stem cells, lymphocytic series stem cells, and corneal series stem cells.

The somatic cells indicate cells to constitute multicellular organisms, and examples thereof include osteoblast cells, chondrocytes, hematopoietic cells, epithelial cells (e.g., mammary gland epithelial cells), endothelial cells (e.g., vascular endothelial cells), epidermal cells, fibroblasts, mesenchyme-derived cells, cardiac muscle cells, myoblastic cells, smooth myocytes, biological origin skeletal myocytes, human tumor cells, fiber cells, EB virus-modified cells, hepatocytes, renal cells, bone-marrow cells, macrophages, hepatic parenchymal cells, small intestinal cells, mammary cells, salivary gland cells, thyroid gland cells, skin cells, plasma cells, T cells, B cells, killer cells, lymphoblasts, and pancreatic beta cells, which, however, are not limitative.

The mammal-derived established cell lines include CRFK cells, 3T3 cells, A549 cells, AH130 cells, B95-8 cells, BHK cells, BOSC23 cells, BS-C-1 cells, C3H10T1/2 cells, C-6 cells, CHO cells, COS cells, CV-1 cells, F9 cells, FL cells, FL5-1 cells, FM3A cells, G-361 cells, GP+E-86 cells, GP+envAm12 cells, H4-II-E cells, HEK293 cells, HeLa cells, HEp-2 cells, HL-60 cells, HTC cells, HUVEC cells, IMR-32 cells, IMR-90 cells, K562 cells, KB cells, L cells, L5178Y cells, L-929 cells, MA104 cells, MDBK cells, MDCK cells, MIA PaCG-2 cells, N18 cells, Namalwa cells, NG108-15 cells, NRK cells, OC10 cells, OTT6050 cells, P388 cells, PA12 cells, PA317 cells, PC-12 cells, PER.C6 cells, PG13 cells, QGH cells, Raji cells, RPMI-1788 cells, SGE1 cells, Sp2/O-Ag14 cells, ST2 cells, THP-1 cells, U-937 cells, V79 cells, VERO cells, WI-38 cells, $p^2$ cells, and pCRE cells (Cell Culture Technology (edited by the Cell Culture Society of Japan, published by Asakura Publishing Co., Ltd., 1999).

The insect cells include silkworm cells (e.g., BmN cells and BoMo cells), *Bombyx mandarina* cells, tussah cells, ailanthus moth cells, cabbage armyworm cells (e.g., Sf9 cells and Sf21 cells), *Lemyra imparilis* cells, leaf roller cells, vinegar fly cells, *Boettcherisca peregrine* cells, *Aedes albopictus* cells, *Papilio xuthus* cells, American cockroach cells, and *Trichoplusia ni* cells (e.g., Tn-5 cells, HIGH FIVE cells and MG1 cells) {Insect Biological Factory (written by Shigeru Kimura, published by Kogyo Chosakai Publishing Co., Ltd., 2000)}.

The above cells may aggregate together or may be differentiated. The aggregated cells may have a function as an organ. The cells may be one immediately after collected from living bodies, or may be cultivated. The cells collected from living bodies may form an organ.

Examples of the physiologically active substance include cell-adhesive proteins or peptides such as gelatin, collagen, laminin, fibronectin, and synthetic RGD peptide; growth factors such as a fibroblast growth factor (FGF), an epithelial growth factor (EGF), and a vascular endothelial growth factor (VEGF); acidic polysaccharides such as heparin, and hyaluronic acid; and various pharmaceuticals. Examples of the enzyme include protease, lipase, amylase, and cellulase.

The hydrogel-forming composition may further contain additives such as a light absorbent, a polymerization inhibitor, a chain transfer agent, a colorant and a preservative, within a range not detracting from the advantageous effects of the present invention. One alone or two or more kinds of these may be used either singly or as combined.

<Curing of Hydrogel-Forming Composition>

The hydrogel-forming composition of the present invention can be gelled by crosslinking the vinyl alcohol polymer therein by active energy rays or heat in the subsequent crosslinking step to be mentioned below, and accordingly, a hydrogel of the present invention can be provided. Examples of the active energy rays include gamma rays, UV rays, visible rays, IR rays (heat rays), radio waves, alpha rays, beta rays, electron beams, plasma streams, ionizing rays, and particle beams.

[Radical Polymerization Initiator]

In the case where the vinyl alcohol polymer is crosslinked by UV rays, visible rays or IR rays (heat rays) of the above-mentioned active energy rays or by heat, it is preferable that the hydrogel-forming composition contains a radical polymerization initiator. The radical polymerization initiator includes a photoradical polymerization initiator and a thermal radical polymerization initiator.

The thermal radical polymerization initiator induces radical polymerization by heat acting as a trigger, and therefore, after an ethylenically unsaturated group-having vinyl alcohol polymer is sterilized in an autoclave and formed into a hydrogel-forming composition, a thermal radical polymerization initiator needs to be added to the resultant composition. At that time, the thermal radical polymerization initiator is preferably sterilized according to the most appropriate method of the above-mentioned sterilization methods. Examples of the method of sterilizing a thermal radical polymerization initiator include a method of sterilizing a solid thermal radical polymerization initiator with an ethylene oxide gas, and a method of filtering and sterilizing an aqueous solution of a thermal radical polymerization initiator.

Not specifically limited, the thermal radical polymerization initiator may be any one capable of initiating radical polymerization by heat, and includes azo-type initiators and peroxide-type initiators that are generally used in radical polymerization. From the viewpoint of improving the transparency and the physical properties of the hydrogel, peroxide-type initiators not generating a gas are preferred, and from the viewpoint that the hydrogel-forming composition contains a water-based solvent, peroxide-type initiators having a high solubility in water are preferred. Specifically examples thereof include inorganic peroxides such as ammonium persulfate, potassium persulfate, and sodium persulfate, and above all, sodium persulfate is referred, and sodium peroxodisulfate is more preferred.

A redox initiator combined with a reducing agent is also employable. A redox initiator can form a first polymer network to cure the polymer by stimulation of mixing a peroxide initiator and a reducing agent. The reducing agent to be combined with the redox initiator may be any known reducing agent. Among them, N,N,N',N'-tetramethylethylenediamine, sodium sulfite, sodium hydrogensulfite and sodium hydrosulfite having a high solubility in water are preferred.

Within a range not detracting from the transparency and the physical properties of the hydrogel, a water-soluble azo-type initiator is also usable. Specifically examples thereof include 2,2'-azobis[2-(2-imidazolin-2-yl)propane] dihydrochloride (trade name "VA-044"), 2,2'-azobis[2-(2-imidazolin-2-yl)propan]dihydrochloride dihydrate (trade name "VA-044B"), 2,2'-azobis[2-methylpropionamidine] dihydrochloride (trade name "V-50"), 2,2'-azobis[N-(2-carboxyethyl)-2-methylpropionamidine] tetrahydrate (trade name "VA-057"), 2,2'-azobis[2-(2-imidazolin-2-yl)propan] (trade name "VA-061"), 2,2'-azobis[2-methyl-N-(2-hydroxyethyl)propionamide (trade name "VA-086"), and 4,4'-azobis(4-cyanopentanoic acid) (trade name "V-501") (all by Wako Pure Chemical Corporation).

In the case where the hydrogel-forming composition of the present invention contains a thermal radical polymerization initiator, preferably the composition is heated at a temperature lower than 100° C. The heating temperature can be appropriately controlled depending on the kind of the thermal radical polymerization initiator to be used, and is preferably 30 to 90° C., more preferably 35 to 80° C.

A photoradical polymerization initiator induces radical polymerization in the presence of light acting as a trigger and is generally stable against heat in many cases. Consequently after such a photoradical polymerization initiator is mixed with a vinyl alcohol polymer and a solvent, the resulting mixture may be sterilized in an autoclave to prepare a hydrogel-forming composition.

Needless-to-say like the case of using a thermal radical polymerization initiator, a composition preparation may be autoclave-sterilized to prepare a hydrogel-forming composition, and then a photoradical polymerization initiator appropriately sterilized may be added thereto.

Not specifically limited, the photoradical polymerization initiator may be any one capable of initiating radical polymerization by irradiation with active energy rays such as UV rays or visible rays, and is preferably one soluble in water. Specifically examples thereof include α-ketoglutaric acid, 1-[4-(2-hydroxyethoxy)-phenyl]-2-hydroxy-2-methyl-1-propan-1-one (trade name "IRGACURE 2959" by BASF Japan Corporation), lithium phenyl(2,4,6-trimethylbenzoyl) phosphinate (trade name "L0290" by Tokyo Chemical Industry Co., Ltd.), 2,2'-azobis[2-methyl-N-(2-hydroxyethyl)propionamide] (trade name "VA-086", by Wako Pure Chemical Corporation), and Eosin Y.

In the case where the hydrogel-forming composition contains a photoradical polymerization initiator, the active energy rays usable for irradiation treatment include visible rays and UV rays, and are preferably UV rays from a high-pressure mercury lamp, a low-pressure mercury lamp, a xenon lamp, or a metal halide lamp.

The content of the radical polymerization initiator in the hydrogel-forming composition can be appropriately controlled depending on the kind of the radical polymerization initiator, and is, from the viewpoint of accelerating crosslinking reaction to improve the mechanical strength of the resultant hydrogel, preferably $5 \times 10^{-6}$% by mass or more, more preferably $1 \times 10^{-5}$% by mass or more. Also the content of the radical polymerization initiator is, from the viewpoint of reducing the radical polymerization initiator to remain in the gel and from the viewpoint of suppressing embrittlement of the hydrogel, preferably 3% by mass or less, more preferably 1% by mass or less, even more preferably 0.5% by mass or less.

[Hydrogel]

The hydrogel of the present invention is one produced by crosslinking the above-mentioned hydrogel-forming composition, and more specifically a sterilized, above hydrogel-forming composition is cured to give a hydrogel having an arbitrary shape.

For example, a sterilized, hydrogel-forming composition is cast into a predetermined form and then cured according to the above-mentioned method to give a shaped hydrogel. In the case where a material extrusion deposition method such as that for a 3D printer, or an inkjet method is employed, a sterilized hydrogel-forming composition is jetted out through a syringe or a printer head and then cured by stimulation of light or heat to be shaped into a desired form. Further, in laser beam lithography a photopolymerization initiator-containing, sterilized hydrogel-forming composition is put into a container having a desired shape, and processed for laser beam lithography to be shaped into a desired form. The hydrogel can be formed in the form of granules according to a known technique, for example, according to a suspension polymerization method, a membrane emulsification method, a microfluid method, a nozzle extrusion method, or a spray drying method.

The hydrogel, and the hydrogel-forming composition of the present invention are excellent in hydrophilicity, reactivity, biodegradability biocompatibility, and low toxicity and has a high mechanical strength even though it is sterilized. Consequently, formed into various shapes using a 3D printer or a mold, these can be favorably used in various fields of contact lenses; organ models; drug delivery carriers; encapsulation carriers for cells and microorganisms; coatings for medical appliances; artificial intervertebral disk nuclei; ground improvement material; and antifouling coating materials.

EXAMPLES

Hereinunder the present invention is described in detail with reference to Examples, but the present invention is not restricted by these Examples.

[Raw Materials Used]

Main components used in Synthesis Examples, Examples and Comparative Examples are shown below.

<Raw Material Polyvinyl Alcohol>

PVA117: polyvinyl alcohol (trade name "PVA117", polymerization degree, 1700; saponification degree, about 98 to 99 mol %, viscosity (4%, 20° C.), 25 to 31 mPa·s, by Kuraray Co., Ltd.)

PVA217: polyvinyl alcohol (trade name "PVA217", polymerization degree, 1700; saponification degree, about 87 to 89 mol %, viscosity (4%, 20° C.), 20.5 to 24.5 mPa·s, by Kuraray Co., Ltd.)

PVA105: polyvinyl alcohol (trade name "PVA105", polymerization degree, 500; saponification degree, about 98 to 99 mol %, viscosity (4%, 20° C.), 5.2 to 6 mPa·s, by Kuraray Co., Ltd.)

PVA103: polyvinyl alcohol (trade name "PVA103", polymerization degree, 300; saponification degree, about 98 to 99 mol %, viscosity (4%, 20° C.), 3.2 to 3.8 mPa·s, by Kuraray Co., Ltd.)

The polymerization degree of the raw material PVA is measured according to JIS K 6726:1994.

<Ethylenically Unsaturated Group-Containing Compound>

Vinyl methacrylate: by Tokyo Chemical Industry Co., Ltd.

5-Norbornene-2-carboxyaldehyde: by Tokyo Chemical Industry Co., Ltd.

<Carboxy Group-Having Water-Soluble Polymer>

Sodium alginate (NSPLLR): trade name "Duck Algin NSPLLR", viscosity of 1 mass % aqueous solution (temperature: 20° C.), 40 to 50 mPa·s, by Kikkoman Biochemifa Company <Photoradical Polymerization Initiator>

Irgacure 2959: 1-[4-(2-Hydroxyethoxy)-phenyl]-2-hydroxy-2-methyl-1-propan-1-one (trade name "IRGACURE 2959", by BASF Japan Corporation)

L0290: Lithium phenyl(2,4,6-trimethylbenzoyl)phosphinate (trade name "L0290", by Tokyo Chemical Industry Co., Ltd.)

<Thermal Radical Polymerization Initiator>

Sodium peroxodisulfate: by Wako Pure Chemical Corporation

<Polythiol>

3,6-Dioxa-1,8-octanedithiol: by Tokyo Chemical Industry Co., Ltd.

<Monomer>

N-butyl acrylate: by Nippon Shokubai Co., Ltd.

Trimethylolpropane trimethacrylate: trade name "Light Ester TMP" by Kyoeisha Chemical Co., Ltd.

Allyl methacrylate: by Tokyo Chemical Industry Co., Ltd.

Dicyclopentanyl methacrylate: trade name "Fancryl FA-513M", by Hitachi Chemical Co., Ltd.

<Emulsifier>

Trade name "Eleminol JS-20" by Sanyo Chemical Industries, Ltd.

<Solvent>

Ion-exchanged water: ion-exchanged water having an electroconductivity of $0.08 \times 10^{-4}$ S/m or less

[Measurement Methods for Compounds Synthesized in Synthesis Examples]

<Polymerization Degree of Ethylenically Unsaturated Group-Having Vinyl Alcohol Polymer>

The polymerization degree of the ethylenically unsaturated group-having vinyl alcohol polymers produced in the following Synthesis Examples was measured according to JIS K 6726:1994.

(Ethylenically Unsaturated Group Introduction Ratio)

The ethylenically unsaturated group introduction ratio of the ethylenically unsaturated group-having vinyl alcohol polymers produced in the following Synthesis Examples was measured through proton NMR. From the ratio of the integrated values of the signal of the ethylenically unsaturated group and the signal of the vinyl alcohol polymer, the introduction ratio can be derived.

[Proton NMR Measurement Condition]

Apparatus: Nuclear magnetic resonator "JNM-ECX400" by JEOL Corporation Temperature: 25° C.

<Average Particle Size in Emulsion>

A mixture of an emulsion of polymer particles (0.1 mL) and ion-exchanged water (10 mL) was analyzed using a kinematic light-scattering measuring device (device name: FPAR-1000, by Otsuka Electronics Co., Ltd.) to measure the volume-based particle size distribution of the particles therein, and the median diameter measured is referred to as the average particle diameter of the particles.

Operation and evaluation in Examples and Comparative Examples were carried out according to the following methods.

(Autoclave Sterilization)

Using an autoclave sterilizer (KTS-2322 Model) by Alps Alpine Co., Ltd., sterilization was carried out at 121° C. for 20 minutes.

Synthesis of Ethylenically Unsaturated Group-Having Polyvinyl Alcohol

Synthesis Example 1

40 g of PVA117 (monomer recurring unit: 908 mmol) was put into a 1-L separable flask equipped with a Dimroth condenser, 350 mL of dimethyl sulfoxide (DMSO) was added thereto, and stirring with a mechanical stirrer was started. After heated up to 80° C. in a water bath, stirring this was continued at 80° C. for 4 hours. After dissolution of the raw material PVA was visually confirmed, 1.2 g (10.8 mmol) of vinyl methacrylate was added with stirring under heat at 80° C., and this was further stirred at 80° C. for 3 hours. After left cooled, the reaction solution was poured into 2 L of methanol with stirring. Stirring was stopped, and this was left as such for 1 hour. The resultant solid was collected, and further washed by immersion in 1 L of methanol for 1 hour. The washing operation was repeated for a total of 3 times. The collected solid was dried overtime in vacuum at room temperature to give a methacryloylated PVA117. The ethylenically unsaturated group (methacryloyl group) introduction ratio into the methacryloylated PVA 117 was 1.2 mol % relative to the recurring unit of PVA (hereinafter abbreviated as "MA-PVA117 (1.2)").

Synthesis Examples 2 to 3

Methacryloylated PVAs were produced in the same manner as in Synthesis Example 1 except that the raw material PVA or the methacryloyloxy group introduction ratio was changed as in Table 1.

Synthesis Example 4

60 g of "PVA117" (monomer recurring unit: 1.36 mol) was put into a 1-L separable flask equipped with a Dimroth condenser, 540 mL of ion-exchanged water was added thereto, and stirring with a mechanical stirrer was started. After heated up to 80° C. in a water bath, stirring this was continued for 4 hours. After dissolution of the raw material PVA was visually confirmed, this was cooled down to a temperature of 40° C. With stirring at 40° C., 2.5 g (20.5 mmol) of 5-norbornene-2-carboxyaldehyde and 22 mL of an aqueous 10 vol % sulfuric acid solution were directly added, and further stirred at 40° C. for 4 hours. After left cooled, 80 mL of an aqueous 1 N NaOH solution was added for neutralization, and desalted through a dialysis membrane having a molecular weight cutoff level of 3500 (the operation was carried out four times relative to 5 L of ion exchanged water). The desalted aqueous solution was poured into 2 L of methanol with stirring, and left as such for 1 hour. The resultant solid was collected, and further washed by immersion in 1 L of methanol for 1 hour. The collected solid was dried overtime in vacuum at room temperature to give a norbornated PVA. The norbornene introduction ratio was 1.3 mol % relative to the monomer recurring unit of PVA (hereinafter abbreviated as Nor-PVA117 (1.3)).

Comparative Synthesis Examples 1 to 2

MA-PVA103(2.0) and MA-PVA117(12) were produced in the same manner as in Synthesis Example 1 except that the raw material PVA or the methacryloyloxy group introduction ratio was changed as in Table 1.

TABLE 1

| | Ethylenically Unsaturated Group-Having Vinyl Alcohol Polymer | | | |
|---|---|---|---|---|
| | Kind | Raw Material PVA | Polymerization Degree | Ethylenically Unsaturated Group Introduction Ratio (mol %) |
| Synthesis Example 1 | MA-PVA117(1.2) | PVA117 | 1700 | 1.2 |
| Synthesis Example 2 | MA-PVA217(2.0) | PVA217 | 1700 | 2.0 |
| Synthesis Example 3 | MA-PVA105(2.0) | PVA105 | 500 | 2.0 |
| Synthesis Example 4 | Nor-PVA117(1.3) | PVA117 | 1700 | 1.3 |
| Comparative Synthesis Example 1 | MA-PVA103(2.0) | PVA103 | 300 | 2.0 |
| Comparative Synthesis Example 2 | MA-PVA117(12) | PVA117 | 1700 | 12 |

Synthesis of Polymer Particles

Synthesis Example A: N-Butyl Acrylate (BA)/Dicyclopentanyl Methacrylate (TCDMA) Particles (Step 1)

240 g of ion-exchanged water, 91.368 g of "Eleminol JS-20" and 1.08 g of sodium peroxodisulfate were put into a dried 2-L pressure-resistant polymerization tank, and then bubbled with a nitrogen gas for 30 minutes for deoxidization treatment to give an aqueous solution.

After the aqueous solution was heated up to 60° C., 365.4 g of a monomer mixture to form polymer particles (n-butyl acrylate/trimethylolpropane trimethacrylate/allyl methacrylate=360/1.8/3.6 (by weight)) was deoxidized and continuously added thereto at a rate of 10 mL/min.

(Step 2)

At the time when the overall monomer conversion rate was confirmed to have reached over 99% by mass, 45 g of dicyclopentanyl methacrylate was deoxidized and continuously added to the emulsion obtained in the previous step 1, at a rate of 10 mL/min.

(Step 3)

At the time when the overall monomer conversion rate was confirmed to have reached over 99% by mass, the emulsion obtained in the previous step 2 was heated up to 100° C., and stirred for 2 hours for decomposition of the remaining polymerization initiator. The polymerization tank was cooled down to 25° C., and the emulsion of polymer particles (BA/TCDMA particles) was taken out. The average particle size in the emulsion was 47.4 nm, and the solid concentration therein was 28% by mass.

Example 1

90 mL of ion-exchanged water was added to 10 g of MA-PVA117(1.2) and dissolved it with stirring at 80° C. for 4 hours to give a solution of a polyvinyl alcohol polymer. After cooled down to room temperature, a water-soluble photopolymerization initiator, "Irgacure 2959" was dissolved in the solution to have a concentration of 0.1% by mass, and sterilized in an autoclave (121° C., 20 minutes, shown as "AC" in Table 2) to produce a fluid hydrogel-forming composition. This was checked for presence of microorganisms according to the sterility test method (direct method) specified in the general test methods of the Japanese Pharmacopoeia, and presence of no microorganisms was confirmed.

Next, the solution was cast between glass plates sandwiched via a 1-mm spacer therebetween, and irradiated with UV rays at 145 mW/cm$^2$ for 30 seconds (irradiation energy dose: 1200 mJ/cm$^2$) using a metal halide lamp by GS Yuasa Corporation. As a result, this was fully cured to give a resilient gel having a sense of unity.

Example 2

80 mL of ion-exchanged water was added to 20 g of MA-PVA117(1.2) and dissolved it with stirring at 80° C. for 4 hours to give a polyvinyl alcohol polymer solution. 9 g of the emulsion of BA/TCDMA particles of Synthesis Example 1 (solid concentration, 28% by mass) was added to 15 g of the solution, and 6 g of ion-exchanged water was added thereto and stirred. Subsequently a water-soluble photopolymerization initiator "Irgacure 2959" was dissolved therein to have a concentration of 0.1% by mass, and autoclave-sterilized (121° C., 20 minutes) to give a fluid hydrogel-forming composition. This was checked for presence of microorganisms according to the sterility test method (direct method) specified in the general test methods of the Japanese Pharmacopoeia, and presence of no microorganisms was confirmed.

The solution was irradiated with UV in the same manner as in Example 1, and this was fully cured to give a resilient gel having a sense of unity.

Example 3

90 mL of ion-exchanged water was added to 10 g of MA-PVA117(1.2) and dissolved it with stirring at 80° C. for 4 hours to give a polyvinyl alcohol polymer solution. After cooled down to room temperature, a water-soluble photopolymerization initiator, "L0290" was dissolved in the solution to have a concentration of 0.1% by mass, and sterilized in an autoclave (121° C., 20 minutes) to produce a fluid hydrogel-forming composition. This was checked for presence of microorganisms according to the sterility test method (direct method) specified in the general test methods of the Japanese Pharmacopoeia, and presence of no microorganisms was confirmed.

Next, the solution was cast between glass plates sandwiched via a 1-mm spacer therebetween, and irradiated with UV rays for 4 minutes using UV Curing Unit S2 from DWS. As a result, this was fully cured to give a resilient gel having a sense of unity.

Example 4

90 mL of ion-exchanged water was added to 10 g of MA-PVA117(1.2) and dissolved it with stirring at 80° C. for 4 hours to give a polyvinyl alcohol polymer solution. The ethylenically unsaturated group-containing PVA solution was autoclave-sterilized (121° C., 20 minutes) to give a fluid hydrogel-forming composition. This was checked for presence of microorganisms according to the sterility test method (direct method) specified in the general test methods of the Japanese Pharmacopoeia, and presence of no microorganisms was confirmed.

Next, a thermal radical polymerization initiator solution prepared by dissolving 0.2 g of sodium peroxodisulfate in 2 mL of ion-exchanged water was sterilized by filtration through a 0.22-μm filter, and 1 mL of the sterilized thermal radical polymerization initiator solution was added to the hydrogel-forming composition.

Next, the solution was cast between glass plates sandwiched via a 1-mm spacer therebetween, and cured at 80° C. for 30 minutes. As a result, this was fully cured to give a resilient gel having a sense of unity.

Example 5

90 mL of ion-exchanged water was added to 10 g of MA-PVA117(1.2) and dissolved it with stirring at 80° C. for 4 hours to give an ethylenically unsaturated group-containing PVA solution. After cooled down to room temperature, 2 g of sodium alginate (NSPLLR) was added to the ethylenically unsaturated group-having PVA solution, and stirred at room temperature for 3 hours. A water-soluble photopolymerization initiator, "Irgacure 2959" was dissolved in the alginate-containing, aqueous MA-PVA solution to have a concentration of 0.1% by mass, and autoclave-sterilized (121° C., 20 minutes) to give a fluid hydrogel-forming composition. This was checked for presence of microorganisms according to the sterility test method (direct method) specified in the general test methods of the Japanese Pharmacopoeia, and presence of no microorganisms was confirmed.

Next, the solution was cast between glass plates sandwiched via a 1-mm spacer therebetween, and irradiated with UV rays at 145 mW/cm$^2$ for 30 seconds (irradiation energy dose: 1200 mJ/cm$^2$) using a metal halide lamp by GS Yuasa Corporation. The resultant hydrogel was immersed in an aqueous calcium chloride solution (1 g of calcium chloride/100 mL of water) for 30 minutes to give a hydrogel of a interpenetration gel.

Example 6

A hydrogel-forming composition was produced in the same manner as in Example 1 except that MA-PVA217(2.0) was used in place of MA-PVA117(1.2), and irradiated with UV. As a result, this was fully cured to give a resilient gel having a sense of unity. The hydrogel-forming composition was checked for presence of microorganisms according to the sterility test method (direct method) specified in the general test methods of the Japanese Pharmacopoeia, and presence of no microorganisms was confirmed.

Example 7

A hydrogel-forming composition was produced in the same manner as in Example 3 except that MA-PVA105(2.0) was used in place of MA-PVA117(1.2), and irradiated with UV. As a result, this was fully cured to give a resilient gel having a sense of unity. The hydrogel-forming composition was checked for presence of microorganisms according to the sterility test method (direct method) specified in the general test methods of the Japanese Pharmacopoeia, and presence of no microorganisms was confirmed.

Example 8

90 mL of ion-exchanged water was added to 10 g of Nor-PVA117(1.3) and dissolved it with stirring at 80° C. for 4 hours. This was cooled down to room temperature, and 0.26 g of a polythiol, 3,6-dioxa-1,8-octanedithiol was added to give a vinyl alcohol polymer solution. A water-soluble photopolymerization initiator "Irgacure 2959" was added to the solution to have a concentration of 0.1% by mass, and autoclave-sterilized (121° C., 20 minutes) to give a fluid hydrogel-forming composition. This was checked for presence of microorganisms according to the sterility test method (direct method) specified in the general test methods of the Japanese Pharmacopoeia, and presence of no microorganisms was confirmed.

The forming composition was irradiated with UV in the same manner as in Example 1, and was fully cured to give a resilient gel having a sense of unity.

Comparative Example 1

90 mL of ion-exchanged water was added to 10 g of MA-PVA103(2.0) and dissolved it with stirring at 80° C. for 4 hours. This was cooled down to room temperature, and a water-soluble photopolymerization initiator "Irgacure 2959" was added thereto to have a concentration of 0.1% by mass. The solution was sterilized by filtration through a 0.22-µm filter to prepare a hydrogel-forming composition. This was checked for presence of microorganisms according to the sterility test method (direct method) specified in the general test methods of the Japanese Pharmacopoeia, and presence of no microorganisms was confirmed.

The solution was irradiated with UV in the same manner as in Example 1, but though cured, an extremely brittle gel was produced.

Comparative Example 2

90 mL of ion-exchanged water was added to 10 g of MA-PVA103(2.0) and dissolved it with stirring at 80° C. for 4 hours. This was cooled down to room temperature, and a water-soluble photopolymerization initiator "L0290" was added thereto to have a concentration of 0.1% by mass. The solution was sterilized by filtration through a 0.22-µm filter to prepare a hydrogel-forming composition. This was checked for presence of microorganisms according to the sterility test method (direct method) specified in the general test methods of the Japanese Pharmacopoeia, and presence of no microorganisms was confirmed.

The solution was irradiated with UV in the same manner as in Example 3, but though cured, an extremely brittle gel was produced.

Comparative Example 3

A hydrogel-forming composition was produced in the same manner as in Comparative Example 1 except that autoclave sterilization was employed in place of filtration sterilization. This was irradiated with UV, but though cured, an extremely brittle gel was produced. The hydrogel-forming composition was checked for presence of microorganisms according to the sterility test method (direct method) specified in the general test methods of the Japanese Pharmacopoeia, and presence of no microorganisms was confirmed.

Comparative Example 4

90 mL of ion-exchanged water was added to 10 g of MA-PVA117(12) and dissolved it with stirring at 80° C. for 4 hours. (However, an undissolved solid remained in the solution.) This was cooled down to room temperature, and a water-soluble photopolymerization initiator "Irgacure 2959" was added to the solution to have a concentration of 0.1% by mass, and autoclave-sterilized 121° C., 20 minutes, shown as "AC" in Table 2) to give a hydrogel-forming composition. This was checked for presence of microorganisms according to the sterility test method (direct method) specified in the general test methods of the Japanese Pharmacopoeia, and presence of no microorganisms was confirmed.

The solution was irradiated with UV in the same manner as in Example 3, but a gel was not produced.

<Evaluation of Tensile Strength at Break of Gel]

The tensile strength of the gels obtained in Examples 1 to 8 and Comparative Examples 1 to 4 was measured according to the following process. A 1-mm hydrogel was taken out in Examples 1 to 8 and Comparative Examples 1 to 4, and according to the method described in JP 2015-004059 A, a test piece was cut out using a dumbbell cutter specified in JIS K 6251:2017. Using a cover-up liquid, two reference points were given to each test piece, and the distance between the reference points was measured with a caliper. Using a micrometer, the width and the thickness of the test piece were measured. The test piece was set on a tensile tester (5566 Model) by Easton Japan, and the stress at break and the strain at break thereof were measured while obtaining image data. In the present evaluation, a larger numerical value means a higher mechanical strength of the gel.

TABLE 2

| | | | Example | | | | | | | | Comparative Example | | | |
|---|---|---|---|---|---|---|---|---|---|---|---|---|---|---|
| | | | 1 | 2 | 3 | 4 | 5 | 6 | 7 | 8 | 1 | 2 | 3 | 4 |
| Formulation of Hydrogel-Forming Composition | Vinyl Alcohol Polymer | MA-PVA117 (1.2) [Polymerization Degree = 1700] | 10.00 | 10.00 | 10.00 | 9.90 | 9.79 | | | | | | | |
| | | MA-PVA217 (2.0) [Polymerization | | | | | | 10.00 | | | | | | |

TABLE 2-continued

| | | Example | | | | | | | | Comparative Example | | | |
|---|---|---|---|---|---|---|---|---|---|---|---|---|---|
| | | 1 | 2 | 3 | 4 | 5 | 6 | 7 | 8 | 1 | 2 | 3 | 4 |
| (mass %) | MA-PVA105 (2.0) [Polymerization Degree = 500] | | | | | | | 10.00 | | | | | |
| | Nor-PVA117 (1.3) [Polymerization Degree = 1700] | | | | | | | | 9.96 | | | | |
| | Comparative Polymer MA-PVA103 (2.0) [Polymerization Degree = 300] | | | | | | | | | 10.00 | 10.00 | 10.00 | |
| | MA-PVA117 (12) [Polymerization Degree = 1700] | | | | | | | | | | | | 10.00 |
| Radical Polymerization Initiator | Irgacure 2959 | 0.10 | 0.10 | | | 0.10 | 0.10 | | 0.10 | 0.10 | | 0.10 | 0.10 |
| | L0290 | | | 0.10 | | | | 0.10 | | | 0.10 | | |
| | Sodium Peroxodisulfate | | | | 0.10 | | | | | | | | |
| Polymer Particles | BA/TCDMA Particles | | 8.40 | | | | | | | | | | |
| Carboxy Group-Having Water-Soluble Polymer | Sodium Alginate | | | | | 1.96 | | | | | | | |
| Polythiol | 3,6-Dioxa-1,8-octanedithiol | | | | | | | | 0.26 | | | | |
| | Ion-Exchanged Water | balance | balance | balance | balance | balance | balance | balance | balance | balance | balance | balance | balance |
| | Sterilization Method | AC | AC | AC | AC | AC | AC | AC | AC | Filtration | Filtration | AC | AC |
| | Microorganisms in Hydrogel-Forming Composition | No Presence | | | | | | No Presence | | | | | |
| Evaluation | Curing Time (min) | 0.5 | 0.5 | 4.0 | 30.0 | 0.5 | 0.5 | 0.5 | 0.5 | 0.5 | 4.0 | 0.5 | 4.0 |
| | Tensile Strength at Break of Gel (MPa) | 0.040 | 0.110 | 0.250 | 0.130 | 0.320 | 0.070 | 0.150 | 0.040 | 0.003 | 0.005 | 0 | 0 |

From Table 2, it is known that Examples 1 to 8 have a higher tensile strength at break than Comparative Examples 1 to 4, and are excellent in mechanical strength. In Examples 2 and 5, polymer particles and a carboxy group-having water-soluble polymer are added, and especially in Example 5, an interpenetration gel is formed, and therefore in these, the tensile strength at break could be increased greatly.

Comparative Examples 1 to 3 all use a vinyl alcohol polymer having a polymerization degree of not more than 450, and therefore, as compared with Examples 1 to 8, these have a low tensile strength at break and are overwhelmingly poor in mechanical strength. In Comparative Example 4, the ethylenically unsaturated group introduction ratio is more than the range of the present invention, and therefore a gel itself could not be formed.

INDUSTRIAL APPLICABILITY

The hydrogel-forming composition of the present invention is excellent in hydrophilicity, reactivity, biodegradability biocompatibility and low toxicity and has a high mechanical strength even though it is sterilized. Consequently formed into various shapes using a 3D printer or a mold, the composition can be favorably used in various fields of contact lenses; organ models; drug delivery carriers; encapsulation carriers for cells and microorganisms; coatings for medical appliances; artificial intervertebral disk nuclei; ground improvement material; and antifouling coating materials.

The invention claimed is:

1. A hydrogel-forming composition comprising a vinyl alcohol polymer having an ethylenically unsaturated group and having a polymerization degree of 1500 or more, in which the ethylenically unsaturated group introduction ratio is 0.01 to 10 mol % in all the structural units constituting the vinyl alcohol polymer, and in which no microorganisms detectable by the sterility test method (direct method) specified in the general test methods of the Japanese Pharmacopoeia are present, wherein the ethylenically unsaturated group is at least one kind selected from the group consisting of a vinyl group, a (meth)acryloyloxy group, a (meth)acryloylamino group, a vinylphenyl group, a norbornenyl group, and derivatives thereof, and wherein a tensile strength at break of a crosslinked hydrogel of the hydrogel-forming composition is 0.040 to 0.320 MPa.

2. A method for producing a hydrogel-forming composition of claim 1, wherein a composition preparation prepared by mixing the vinyl alcohol polymer and a solvent is sterilized.

3. A method for producing a hydrogel-forming composition of claim 2, wherein the sterilization is autoclave sterilization.

4. A method for preparing a hydrogel comprising:

providing the hydrogel-forming composition of claim 1, and then crosslinking the hydrogel-forming composition.

* * * * *